United States Patent [19]
Wakamiya

[11] Patent Number: 4,707,098
[45] Date of Patent: Nov. 17, 1987

[54] ALBADA FINDER
[75] Inventor: Koichi Wakamiya, Tokyo, Japan
[73] Assignee: Nippon Kogaku K. K., Tokyo, Japan
[21] Appl. No.: 838,572
[22] Filed: Mar. 11, 1986
[30] Foreign Application Priority Data
Mar. 14, 1985 [JP] Japan .................. 60-51297
[51] Int. Cl.$^4$ ............................................. G03B 13/02
[52] U.S. Cl. .................................................. 354/219
[58] Field of Search .............. 354/219, 222, 223, 155;
350/410, 423

[56] References Cited
U.S. PATENT DOCUMENTS
3,043,180 7/1962 Papke ................................... 354/219
3,517,582 6/1970 Pituley ................................. 354/219
4,358,190 11/1982 Sakai .............................. 354/219 X FOREIGN PATENT DOCUMENTS
58-149017 5/1983 Japan .
915118 1/1963 United Kingdom ............... 354/219

Primary Examiner—Donald A. Griffin
Attorney, Agent, or Firm—Shapiro and Shapiro

[57] ABSTRACT

In an albada finder having index means for indicating the photographable area of an object to be photographed and an albada reflecting surface positioned more adjacent to the object side than the index means and reflecting a light beam from the index means toward the observer side, there is provided a lens in which the albada reflecting surface is formed on the lens surface thereof which is adjacent to the object side.

18 Claims, 6 Drawing Figures

ALBADA FINDER

BACKGROUND OF THE INVENTION

1. Field of the Invention

This invention relates to the optical system of an albada finder used in a camera or the like.

2. Related Background Art

An inverted Galilean type albada finder is often adopted as the finder of a compact camera or the like. The inverted Galilean type albada finder according to the prior art is constituted by an objective of negative refractive power and an eyepiece of positive refractive power disposed on that side of the objective which is adjacent to the eye side, and a field frame is formed on the lens surface in the eyepiece by evaporation of a metal. In order to reflect the light from the field frame and enable the image of the field frame to be observed substantially with the same visibility as the object image, a half-mirror or a reflecting surface having only its marginal portion formed into a reflecting portion (hereinafter referred to as the albada reflecting surface) is provided in the objective. The optical system leading from the field frame via the albada reflecting surface to the observer side through a lens provided on the opposite side of the object with respect to the field frame will hereinafter be referred to as the albada optical system. Also, it is to be understood that the field frame includes a plurality of indexes indicating the area exposed to a film. A construction has heretofore been conceived in which display of the measured distance, display of the warning of improper exposure, display of the preparation for strobo light emission, etc. can be observed near the image of the field frame by the use of such albada optical system. For the purposes of said displays, it is necessary to dispose a prism and pointers near the field frame. To effectively accomplish the disposition of such various display members, it is necessary to keep the combined focal length of the albada optical system long so that the display prism and the display pointers do not cover the field of view of the finder to make a part of the field of view difficult to see.

Where the focal length of the albada optical system is short, as compared with a case where the focal length of the albada optical system is long, it is necessary to make the size of the field frame small, and further, the deviation of the optical path near the field frame between the light beam travelling from the field frame toward the albada reflecting surface and the light beam from the field frame reflected by the albada reflecting surface becomes great. Accordingly, to enable the display members to be observed as if they were near the field frame and to prevent the display members from making an object to be photographed difficult to observe, it becomes necessary to make the combined focal length of the albada optical system long.

Also, if the focal length is short, the field frame is therefore made small, the eccentricity of the lens of the finder optical system is greatly affected.

In recent years, to make the finder optical system compact and make the finder capable of being zoomed or capable of changing the magnification, the construction has become complicated and it has become difficult to provide sufficient space of the albada optical system in the direction of the optic axis and along therewith, it has become difficult to effect the various types of information display as described above.

SUMMARY OF THE INVENTION

It is an object of the present invention to provide an albada finder optical system which is short in full length and compact and capable of various types of information display and in which the information displayed during observation is not a hindrance.

The present invention comprises an albada finder in which the light from a field frame is reflected by the inner surface in a predetermined lens and the combined focal length of an optical system leading from the field frame through the reflecting surface in the predetermined lens to an eyepiece can be made long, and which permits various information display members to be provided within the finder while maintaining the spacing between an objective and the eyepiece as small as in the prior art, and which prevents the image of the field frame by the surface reflection of that surface of the predetermined lens which is adjacent to the eyepiece from being observed as a ghost image.

Further, the albada finder optical system of the present invention has an objective of negative refractive power and an eyepiece of positive refractive power, and the field frame is disposed on the eyepiece so that the image of the field frame by that surface of the predetermined lens which is adjacent to the eyepiece is outside the depth of focus of an eye.

DESCRIPTION OF THE PREFERRED EMBODIMENTS

Figure 1:
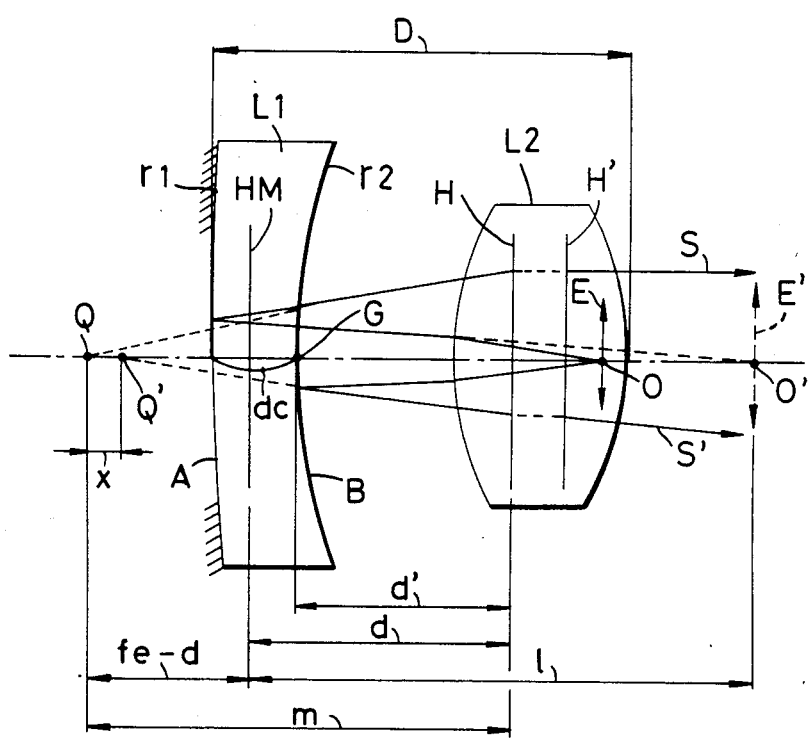
FIG. 1 schematically illustrates the basic construction of the albada optical system in a finder optical system according to the present invention.

Referring to FIG. 1, the surface of a single lens L1 which is adjacent to the object side (the left side of FIG. 1) is formed as an albada reflecting surface and it is to be understood that a field frame E is provided in an eyepiece L2 of positive refractive power. The field frame E is illuminated by a light beam from an object, and a light beam travelling from the field frame toward the object side is reflected by a reflecting surface A formed by evaporation of a metal so as to be able to reflect a part of the light, is transmitted through the surface B of the single lens L1 which is adjacent to the eyepiece, and again passes through the eyepiece L2 to an observing eye, not shown. In FIG. 1, the state of the light ray from the field frame E is indicated by a solid line, and the position of the virtual image thereof is indicated by a dotted line. A light ray S represents the light ray of the albada optical system according to the present invention, and a light ray S' is the light ray in a case where, for the sake of comparison, the surface of the lens L1 is the reflecting surface B.

In the following description of the principle, for simplicity of the description, the entire finder system is considered to be an afocal system, but in practical use, it is desirable that the visibility of the finder be of the order of −1 diopter.

Here, if as shown in FIG. 1, the center thickness of the single lens L1 is $d_c$ and the radius of curvature of the surface of the lens L1 which is adjacent to the object side is $r_1$ and the radius of curvature of the surface of the lens L1 which is adjacent to the eyepiece is $r_2$ and the focal length of the single lens L1 for the light beam from the eyepiece L2 when the surface of the single lens L1 which is adjacent to the object side is a reflecting surface is $f_M$ and the principal point thereof is $H_M$ and the focal length of the eye piece L2 is $f_e$ and the forward principal point of the eyepiece L2 is H and the rearward principal point of the eyepiece L2 is H' and the spacing between the principal point $H_M$ of the back mirror of the single lens L1 and the forward principal point H of the eyepiece L2 is d and the spacing between the vertex G of the surface of the single lens L1 which is adjacent to the eyepiece and the forward principal point of the eyepiece is d' and the apparent image of the field frame E when it is seen from the object side of the eyepiece is E' and the distance between the apparent field frame image and the principal point $H_M$ for the light beam from the eyepiece L2 when the surface of the single lens L1 which is adjacent to the object side is a reflecting surface is l and the full length of the albada optical system, i.e., the distance from the albada reflecting surface to the last surface of the eyepiece, is D and the combined focal length as the albada optical system, i.e., the combined focal length from the field frame E to the exit surface of the eyepiece via the albada reflecting surface A, is $f_T$, then in order that the light beam from the field frame, like the light beam from the object, may be substantially of the visibility of infinity, when $f_e > 0$, the following equations are established with respect to the single lens L1:

$$\frac{1}{l} - \frac{1}{f_e - d} = \frac{1}{f_M} \quad (1)$$

$$\frac{1}{f_T} = \frac{1}{f_M} + \frac{1}{f_e} - \frac{d}{f_e f_M} \quad (2)$$

and if these equations are rearranged with $f_M$ eliminated therefrom, the following equation is obtained:

$$f_T = \frac{f_e l}{f_e - d} \quad (3)$$

When the relation between $f_T$ and d is considered, if $f_e$ is regarded as a constant, the relation that "l−d=constant" is maintained and therefore, equation (3) is modified into:

$$f_T = -f_e + \frac{f_e(f_e + l - d)}{f_e - d} \quad (3')$$

Figure 2:
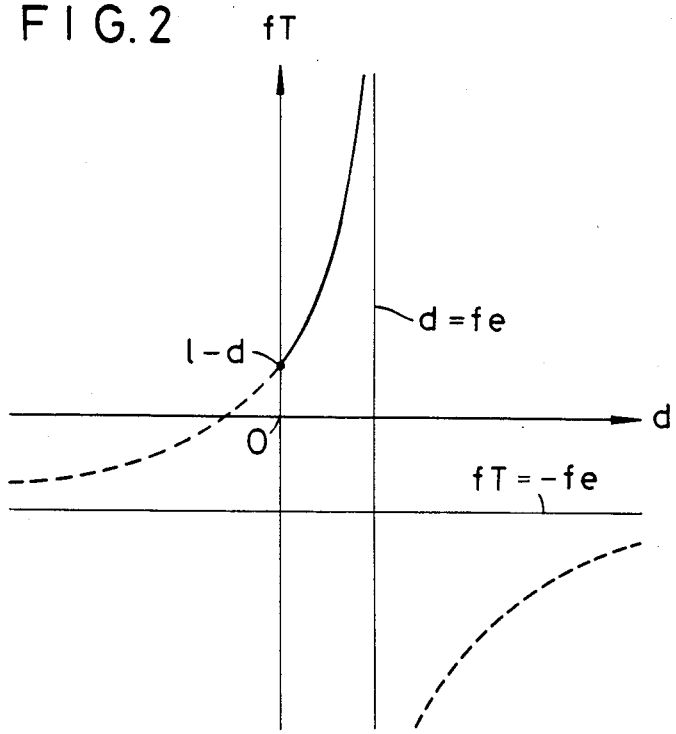
FIG. 2 shows the relation of the combined focal length $f_T$ of the albada optical system with the spacing d between the principal point $H_M$ of a back mirror and the forward principal point H of an eyepiece L2.

The numerator of the second term in the right side of this equation is a constant and if $f_e > d > 0$ and $f_e(f_e + l − d) > 0$, when $f_T$ is plotted as the ordinate and d is plotted as the abscissa, the result is a hyperbola with $d = f_e$ and $f_T = -f_e$ as an asymptote as shown in FIG. 2. With regard to the solid line portion which satisfies $f_e > d > 0$, it is apparent that as the value of d becomes greater, the combined focal length $f_T$ of the albada optical system increases monotonously.

When the refractive index of the single lens L1 is $n_1$, the following relation is derived with respect to this single lens:

$$\frac{1}{f_M} = \frac{2(n_1 - 1)}{r_2} - \frac{2d_c}{n_1}\left(\frac{n_1 - 1}{r_2}\right)^2 + \quad (4)$$

$$\frac{4d_c(n_1 - 1)}{r_1 r_2} + \frac{2n_1}{r_1} + \frac{2d_c^2(n_1 - 1)^2}{r_2^2 r_1 n_1}$$

Also, the distance $d_H$ from the principal point $H_M$ of the single lens L1 to the vertex G of the surface of this lens which is adjacent to the eyepiece is $$d_H = 2d_c f_M \left[ -\frac{n_1 - 1}{r_2 n_1} + \frac{1}{r_1} + \frac{d_c(n_1 - 1)}{r_1 r_2 n_1} \right]$$

and thus, $$\frac{d_c}{d_H} = n_1 \left[ 1 + \frac{d_c(n_1 - 1)}{r_2 n_1} \right]. \quad (6)$$

where it is to be understood that the value of $d_H$ is positive when the principal point $H_M$ is more adjacent to the object side than the vertex G of the surface of the single lens L1 which is adjacent to the eyepiece.

The equation (6) above means that the position of the principal point $H_M$ does not depend on the radius of curvature $r_1$ of the albada reflecting surface. It also means that for $r_2$ when the right side of equation (6) assumes a positive value, that is, for all the values of $r_2$ outside of the range $$-\frac{d_c(n_1 - 1)}{n_1} \leq r_2 \leq 0, \quad (7)$$

the principal point $H_M$ lies more adjacent to the object side than the point G.

The radius of curvature $r_2$ which satisfies the range of the equation (7) above is of a very small value for an ordinary optical member and exceeds the practical area constituting the albada optical system and therefore, the principal point $H_M$ always lies more adjacent to the object side than the vertex G of the surface of the single lens L1 which is adjacent to the eyepiece. Thus, substantially, when the surface A is the albada reflecting surface, $d > d'$ Assuming that in the same construction as that of FIG. 1, the albada reflecting surface is the surface B, the combined focal length $f_T'$ of the albada optical system is $f_T > f_T'$ because $d > d'$, and $f_T'$ is only a shorter focal length.

Also, where the refractive power of the eyepiece L2 is 0, that is, where $f_e = \infty$, $f_M = l$ and $f_T$ increases in proportion to l, but where the albada reflecting surface is the surface A, the value of l becomes greater than where the albada reflecting surface is the surface B and therefore, again $f_T > f_T'$.

A case will now be discussed where the image of the field frame is formed by the reflection on the surface B of the single lens L1 which is adjacent to the eyepiece. Where the image of the field frame by the surface reflection on the surface B is observed with the same degree of visibility of the image of the field frame by the inner reflection in the surface A, it provides a great impediment of the actual observation of the field of view and therefore, the image of the field frame by the surface reflection on the surface B must be sufficiently taken into consideration.

Let it be assumed that the image of the field frame when the albada reflecting surface is a surface reflecting surface is formed at a position of K diopters from the rearward principal point of the eyepiece, that the position of the image of field frame after the light ray S' having left the field frame E is reflected by the surface B of the single lens which is adjacent to the eyepiece is Q' and that the distance to the position Q of the image of the field frame after said light ray S' is reflected by the surface A is x. Also, when the distance from the forward principal point H of the eyepiece L2 to the position Q of the image of the field frame after said light ray S' is reflected by the surface A is m, the following equation is established:

$$\frac{1}{l - (d - d')} - \frac{1}{m - d' - x} = \frac{2}{r_2} \quad (7)$$

and with respect to the eyepiece L2, the following equation is established:

$$\frac{1}{m - x} + \frac{K}{1000} = \frac{1}{f_e} \quad (8)$$

If K is solved in these equations, $$K = \frac{1000}{f_e} - \frac{1000[r_2 - 2(l - d + d')]}{r_2(l - d + 2d') - 2d'(l - d + d')} \quad (9)$$

However, when the refractive power of the eyepiece is 0, that is, $f_e = \infty$, the positions of H and H' are regarded as being coincident with the position of the field frame E, and if d is the spacing between the principal point $H_M$ and the field frame E and d' is the spacing between the vertex G of the surface of the single lens which is adjacent to the eyepiece and the field frame E, the value of K is the diopter value of the distance from the position of the field frame E to the position at which the light ray S' is imaged.

Here, in equation (9) above, it is desirable that K satisfy the following conditions:

$$K < -5, \ 3 < K.$$

That is, the visibility of the object image by a popular inverted galilean type finder is of the order of $-1$ and in contrast, to prevent the image of the field frame by the surface reflection from being observed as a ghost image, it is necessary to make the image of the field frame deviate from the depth of focus of the eye and specifically, a difference of the order of $\pm 4$ in visibility (diopter) is suitable. Accordingly, if the value of K departs from the range of said conditions, the ghost image of the field frame by the surface reflection will become liable to be observed at a smaller size as being superposed on the image of the field frame formed by the inner surface reflection, and in some cases, this will hinder the observation of the field of view.

In the present invention, it is desirable that the value of the center thickness of the lens in which the albada reflecting surface is formed be less than one-third of the distance D from the vertex of the reflecting surface A to the last surface of the eyepiece. Where the lens has a center thickness greater than this value, the point $H_M$ becomes close to the eyepiece side and the distance between this point and the object side principal point of the eyepiece becomes small and the focal length $f_T$ as the albada optical system becomes small, and this is contrary to the object of the present invention. Specifically, in a camera for 35 mm film, it is desirable that the combined focal length $f_T$ of the albada optical system be 12 mm or more, and for this purpose, it is desirable that the full length D of the albada optical system be 10 mm or more. Also, in order to prevent the aggravation of the various aberrations caused by the occurrence of high-order aberrations, the radius of curvature $r_2$ of the side surface of the eyepiece in which the albada reflecting surface is formed should desirably satisfy the following condition:

$$|r_2| > d_c.$$

Figure 3:
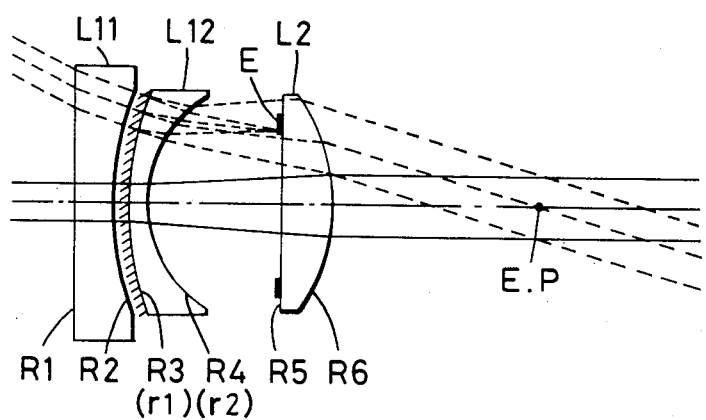
FIG. 3 shows the optical path in a first embodiment of the present invention.

In a first embodiment of the present invention, as shown in the optical path illustration of FIG. 3, the objective is comprised of a plano-concave negative lens and a negative meniscus lens having its convex surface facing the object side, and the eyepiece is comprised of a plano-convex single lens, and the inverted Galilean type finder has a lens construction similar to that disclosed in Japanese Laid-open patent application No. 149017/1983, but is characterized in that the albada reflecting surface is formed as the inner surface of the lens. The finder magnification is 0.57, and the full length of the finder (the distance from the vertex of the foremost surface of the objective to the vertex of the last surface of the eyepiece) is 17.0.

The albada reflecting surface is formed on the surface of the negative meniscus lens in the objective which is adjacent to the object side by evaporation of a metal, and the field frame E is formed on the surface of the eyepiece L2 which is adjacent to the object side as by evaporation. Accordingly, the albada reflecting surface is formed on the negative meniscus lens L12 in the objective, and the lens L12 and the eyepiece L2 together constitute the albada optical system. In FIG. 3, the state of the light rays from the on-axis infinity object point is indicated by solid lines, the state of the light rays from the infinity object point of the maximum angle of view is indicated by dotted lines, and also the state of the light rays from the field frame E is shown.

In the finder of the first embodiment, in succession from the object side, the second surface, the fourth surface and the sixth surface are formed into non-spherical surfaces and, as is well known, these non-spherical surfaces are represented by $$X = \frac{Y^2/R_1}{1 + \sqrt{1 - kY^2/R_i^2}} + C_4Y^4 + C_6Y^6 + C_8Y^8 + C_{10}Y^{10},$$

where Y is the height from the optic axis, $R_i$ is the radius of curvature of the vertex, k is a quadratic surface coefficient, and C4, C6, C8 and C10 are non-sphericity coefficients. A similar form of expression is also used in the ensuing embodiments.

The numerical data of the first embodiment are shown in Table 1 below. In Table 1, the numbers at the left end represent the order from the object side, and the refractive power n and the Abbe number $\nu$ are values for d-line ($\lambda$=587.6 nm). E.P. represents the eye point (pupil).

TABLE 1

(First Embodiment)

| No. | Radius of curvature R | Center thickness or space d | Refractive index n | |
|---|---|---|---|---|
| 1 | ∞ | 2.70 | 1.492 | L11 |
| 2 | 17.0 | 1.00 | | |
| 3 | $r_1$ = 20.82 | 1.50 | 1.492 | L12 |
| 4 | $r_2$ = 8.72 | 8.60 | | |
| 5 | ∞ | 3.20 | 1.492 | L2 |
| 6 | −13.748 | 15.00 | | |
| | E.P. | | | |

Non-spherical surface coefficient

2nd surface K = 1.069
 C4 = 0.12376 × $10^{-6}$
 C6 = −0.9624 × $10^{-7}$
 C8 = 0.27546 × $10^{-9}$
 C10 = 0

4th surface K = 1.232
 C4 = 0.47776 × $10^{-5}$
 C6 = 0.30587 × $10^{-6}$
 C8 = 0.21416 × $10^{-7}$
 C10 = 0

6th surface K = 1.874
 C4 = 0.16442 × $10^{-4}$
 C6 = 0.82135 × $10^{-8}$
 C8 = −0.14158 × $10^{-8}$
 C10 = 0 d = 11.696  D = 13.3
l = 9.551   K = −490.1
d' = 10.745  $f_T$ = 16.80
$f_e$ = 27.943  $f_M$ = 24.510

In the above-described first embodiment, the combined focal length of the albada optical system is 16.80. This value means that where the albada reflecting surface was formed into an albada reflecting surface of surface reflection as in the finder having a similar construction as an inverted Galilean type finder and disclosed in Japanese Laid-open patent application No. 149017/1983, only a combined focal length of the order of 10 could be obtained, whereas the size of the field frame E becomes about 1.7 times larger. Also, in this embodiment, the visibility K of the image of the field frame by the surface reflection of the albada optical system is −490.1, and said image is completely blurred and hardly adversely affects the observation through the finder.

Figure 4A:
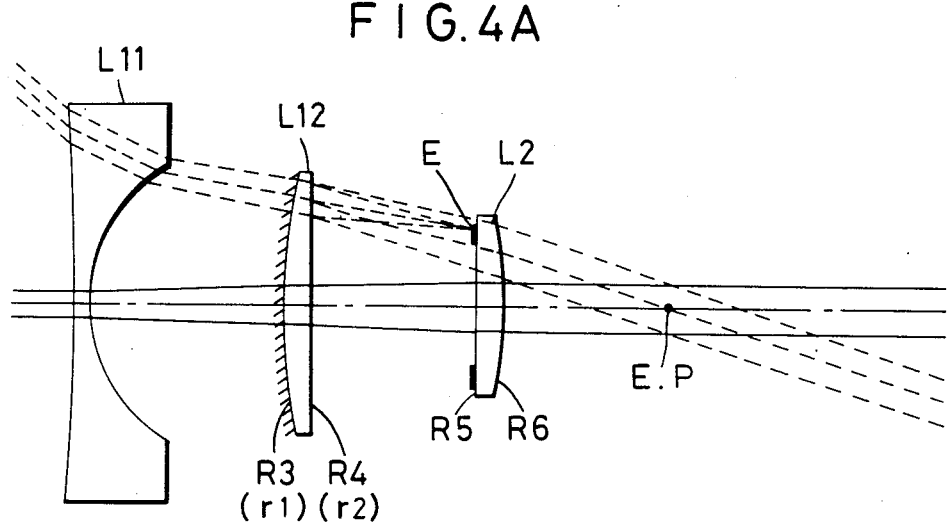
FIGS. 4A and 4B show the wide angle side and the telephoto side optical path, respectively, in a second embodiment of the present invention.
Figure 4B:
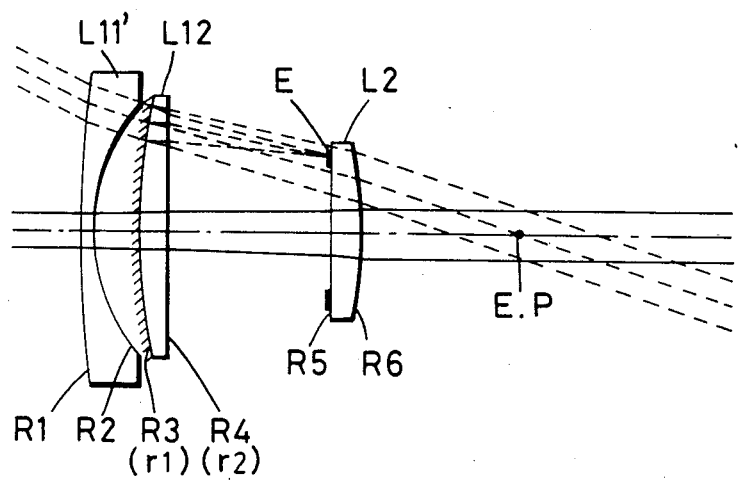

The finder according to a second embodiment of the present invention is of the type in which the magnification is changed by interchanging the negative lens L11 in the objective which is most adjacent to the object side with a negative lens L11', as shown in FIGS. 4A and 4B. FIG. 4A shows the wide angle side (the low magnification state), and FIG. 4B shows the telephoto side (the high magnification state). In this embodiment, the second surface and the sixth surface are formed into non-spherical surfaces, and the surface of the positive lens L12 in the objective fixed for magnification change which is adjacent to the object side constitutes an albada reflecting surface. The third surface is the albada reflecting surface, and the field frame E is provided on the surface of the eyepiece L2 which is adjacent to the object side.

On the wide angle side, the finder magnification B=0.4 and the full length of the finder is 38.5, and on the telephoto side, the finder magnification B=0.6 and the full length of the finder is 25.1. The focal length $f_T$ as the albada optical system is 21.72 which is greater than that in the first embodiment, and the dimensions of the field frame can be made greater. Also, in the albada optical system, the visibility of the image of the field frame formed by the reflection on the surface of the positive lens L12 which is adjacent to the eyepiece is −13.6, and such image is sufficiently blurred and does not hinder the finder field of view.

The numerical data of the second embodiment are shown in Tables 2A and 2B below.

TABLE 2A (Second Embodiment)

| No. | Radius of curvature R | Center thickness or space d | (Wide angle side) Refractive index n | |
|---|---|---|---|---|
| 1 | −243.63 | 1.50 | 1.49108 | L11 |
| 2 | 11.801 | 17.40 | | |
| 3 | $r_1$ = 64.829 | 2.00 | 1.49108 | L12 |
| 4 | $r_2$ = 316.891 | 14.80 | | |
| 5 | ∞ | 2.80 | 1.49108 | L2 |
| 6 | −37.075 | 15.00 | | |
| | E.P. | | | |

Non-spherical surface coefficient

2nd surface K = 0.180
 C4 = 0.1
 C6 = 0
 C8 = 0
 C10 = 0

6th surface K = −28.2
 C4 = −0.45 × $10^{-4}$
 C6 = 0
 C8 = 0.3 × $10^{-8}$
 C10 = 0.1 × $10^{-10}$ D = 18.016  D = 19.6
l = 16.138  K = −13.6
d' = 16.678  $f_T$ = 21.72
$f_c$ = 75.497  $f_M$ = 23.209

TABLE 2B

| No. | Radius of curvature R | Center thickness or space d | Refractive index n | (Telephoto side) Abbe number $\nu$ | |
|---|---|---|---|---|---|
| 1 | 120.000 | 1.00 | 1.49108 | | L11' |
| 2 | 15.100 | 4.50 | | | |

Non-spherical surface coefficient

2nd surface K = 0.360
 C4 = 0.1 × $10^{-4}$
 C6 = 0
 C8 = 0
 C10 = 0

Figure 5:
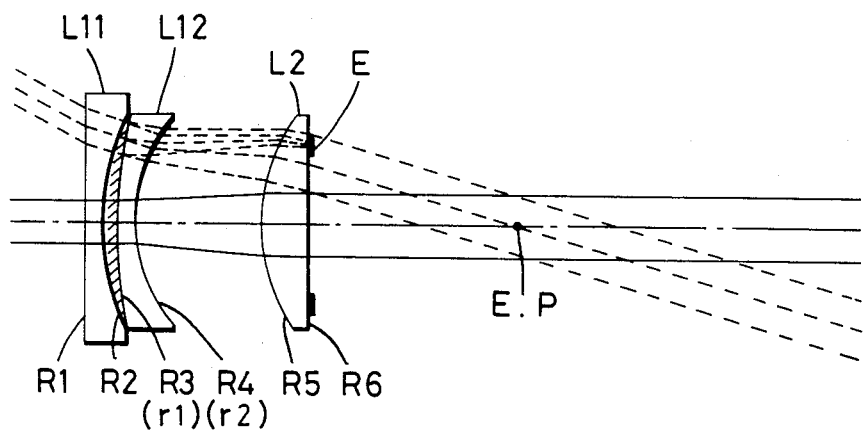
FIG. 5 shows the optical path in a third embodiment of the present invention.

In a third embodiment of the present invention, as shown in FIG. 5, the field frame E is provided on the surface of the eyepiece L2 which is most adjacent to the eye, and the surface R3 of the second negative lens in the objective which is adjacent to the object side is formed as an albada reflecting surface. The finder magnification B=0.57 and the full length of the finder is 15.0. In this finder, the surface of the first negative lens in the objective which is adjacent to the image side, as the second surface R2, is formed into a non-spherical surface.

The numerical data of the third embodiment are shown in Table 3 below.

TABLE 3

(Third Embodiment)

| Radius of curvature | Center thickness or space | Refractive index |
|---|---|---|

TABLE 3-continued (Third Embodiment)

| No. | R | d | n | |
|---|---|---|---|---|
| 1 | ∞ | 1.20 | 1.492 | L11 |
| 2 | 12.081 | 1.00 | | |
| 3 | $r_1 = 27.2$ | 1.00 | 1.492 | L12 |
| 4 | $r_2 = 9.5$ | 8.60 | | |
| 5 | 11.3 | 3.20 | 1.492 | L2 |
| 6 | ∞ | 15.00 | | |
| | E.P. | | | |

Non-spherical surface coefficient

2nd surface K = 0.350    $C_4 = 0$
                         $C_6 = 0$
                         $C_8 = 0$
                         $C_{10} = 0$ $d = 9.248$       $D = 12.8$
$l = 11.614$      $K = -4496.7$
$d' = 8.6$        $f_T = 17.96$
$f_e = 22.967$    $f_M = 97.278$ The combined focal length $f_T$ with respect to the albada of the third embodiment is also a greater value than that in the prior art, and the size of the field frame can be made larger than in the prior art. The visibility K of the image of the field frame by the surface reflection on that surface of the negative meniscus lens having the albada reflecting surface which is adjacent to the eyepiece is −4496.7 diopters, and such image of the field frame is completely blurred relative to the original image of the field frame by the reflecting back surface and therefore does not adversely, affect the observation through the finder.

Each of the embodiments has not only an excellent performance as an inverted Galilean finder, but also a sufficiently good performance as an albada optical system. Acryl is used as the lens material in each embodiment, but of course, this is not restrictive.

It is needless to say that the albada reflecting surface as the inner reflecting surface is not limited to a construction in which the whole of the lens surface is a half-mirror, but only the marginal portion of the lens surface may be formed as a reflecting surface. Also, by making the focal length of the albada optical system long as in the present invention, the angle of the light rays passing through the lens surface forming the albada reflecting surface and illuminating the field frame can be made relatively small and as a result, the field frame is illuminated by light rays passing through the vicinity of the optic axis, and this also leads to the effect that the field frame can be well observed.

What we claim is:

1. In an albada finder having index means for indicating the photographable area of an object to be photographed and an albada reflecting surface positioned more adjacent to the object side than said index means and reflecting a light beam from said index means toward the observer side, the improvement comprising:

a lens having two surfaces adjacent to the object side and the observer side, respectively, that are in contact with air and in which said albada reflecting surface is formed on the lens surface which is adjacent to the object side.

2. An albada finder according to claim 1, wherein said lens is formed so that the image of said index means by the reflection of the light beam from said index means on the lens surface which is adjacent to the observer side deviates from the depth of focus of the observer's eye relative to the image of said index means by the reflection of the light beam from said index means on said albada reflecting surface.

3. An albada finder according to claim 1, further including:

a first lens component disposed on that side of said lens which is adjacent to the object side; and a second lens component disposed on that side of said lens which is adjacent to the observer side.

4. An albada finder according to claim 3, wherein said first lens component and said lens together constitute an objective lens of negative refractive power, and said second lens component constitutes an eyepiece of positive refractive power.

5. An albada finder according to claim 3, wherein said first lens component is a negative lens having its concave surface facing the observer side, said lens is a negative meniscus lens having its convex surface facing the object side, and said second lens component is a positive lens having its convex surface facing the observer side.

6. An albada finder according to claim 3, wherein said first lens component is a negative lens having concave surfaces on the object side and the observer side, said lens is a positive lens having its convex surface facing the object side, and said second lens component is a positive lens having its convex surface facing the observer side.

7. An albada finder according to claim 3, wherein said first lens component is a negative lens having its concave surface facing the observer side, said lens is a negative meniscus lens having its convex surface facing the object side, and said second lens component is a positive lens having its convex surface facing the object side.

8. An albada finder according to claim 3, wherein when the radius of curvature of the surface of said lens which is adjacent to the observer side is $r_2$ and the focal length of said second lens component is $f_e$ and the spacing between the principal point with respect to said albada reflecting surface and the forward principal point of said second lens component is d and the spacing between the vertex of the surface of said lens which is adjacent to the observer side and the forward principal point of said second lens component is $d'$ and the distance between the apparent image of said index means as seen from that side of said second lens component which is adjacent to the object side and the principal point with respect to said albada reflecting surface is $l$ and when it is to be understood that the position of the image of said index means formed by the reflected light on the surface of said lens which is adjacent to the observer side is the position according to the diopter K from the rearward principal point of said second lens component, K is defined as $$K = \frac{1000}{f_e} - \frac{1000[r_2 - 2(l - d + d')]}{r_2(l - d + 2d') - 2d'(l - d + d')}$$

and K satisfies the following conditions:

$$K < -5, \; 3 < K.$$

9. An albada finder according to claim 1, wherein the numerical data are as follows:

TABLE 1

(First Embodiment)

| No. | Radius of curvature R | Center Thickness or space d | Refractive index n |
|---|---|---|---|

TABLE 1-continued (First Embodiment)

| | | | | |
|---|---|---|---|---|
| 1 | ∞ | 2.70 | 1.492 | L11 |
| 2 | 17.0 | 1.00 | | |
| 3 | $r_1 = 20.82$ | 1.50 | 1.492 | L12 |
| 4 | $r_2 = 8.72$ | 8.60 | | |
| 5 | ∞ | 3.20 | 1.492 | L2 |
| 6 | −13.748 | 15.00 | | |
| | E.P. | | | |

(Non-spherical surface coefficient)

| | |
|---|---|
| 2nd surface k = 1.069 | $C4 = 0.12376 \times 10^{-6}$ |
| | $C6 = -0.9624 \times 10^{-7}$ |
| | $C8 = 0.27546 \times 10^{-9}$ |
| | $C10 = 0$ |
| 4th surface k = 1.232 | $C4 = 0.47776 \times 10^{-5}$ |
| | $C6 = 0.30587 \times 10^{-6}$ |
| | $C8 = 0.21416 \times 10^{-7}$ |
| | $C10 = 0$ |
| 6th surface k = 1.874 | $C4 = -0.16442 \times 10^{-4}$ |
| | $C6 = 0.82135 \times 10^{-8}$ |
| | $C8 = -0.14158 \times 10^{-8}$ |
| | $C10 = 0$ |
| $d = 11.696$ | $D = 13.3$ |
| $l = 9.551$ | $K = -490.1$ |
| $d' = 10.745$ | $f_T = 16.80$ |
| $f_e = 27.943$ | $f_M = 24.510$ |

10. An albada finder according to claim 1, wherein the numerical data are as follows:

TABLE 2A (Second Embodiment)

| No. | Radius of curvature R | Center thickness of space d | (Wide angle side) Refractive index n | |
|---|---|---|---|---|
| 1 | −243.63 | 1.50 | 1.49108 | L11 |
| 2 | 11.801 | 17.40 | | |
| 3 | $r_1 = 64.829$ | 2.00 | 1.49108 | L12 |
| 4 | $r_2 = 316.891$ | 14.80 | | |
| 5 | ∞ | 2.80 | 1.49108 | L2 |
| 6 | −37.075 | 15.00 | | |
| | E.P. | | | |

(Non-spherical surface coefficient)

| | |
|---|---|
| 2nd surface k = 0.180 | $C4 = 0.1$ |
| | $C6 = 0$ |
| | $C8 = 0$ |
| | $C10 = 0$ |
| 6th surface k = −28.2 | $C4 = -0.45 \times 10^{-4}$ |
| | $C6 = 0$ |
| | $C8 = 0.3 \times 10^{-8}$ |
| | $C10 = 0.1 \times 10^{-10}$ |
| $d = 18.016$ | $D = 19.6$ |
| $l = 16.138$ | $K = -13.6$ |
| $d' = 16.678$ | $f_T = 21.72$ |
| $f_e = 75.497$ | $f_M = 23.209$ |

11. An albada finder according to claim 1, wherein the numerical data are as follows:

TABLE 2B

| No. | Radius of curvature R | Center thickness or space d | Referactive index n | (Telephoto side) Able number v | |
|---|---|---|---|---|---|
| 1 | −243.64 | 1.50 | 1.49108 | | L11 |
| 2 | 11.801 | 17.40 | | | |

(Non-spherical surface coefficient)

| | |
|---|---|
| 2nd surface k = 0.180 | $C4 = 0.1$ |
| | $C6 = 0$ |
| | $C8 = 0$ |
| | $C10 = 0$ |

12. An albada finder according to claim 1, wherein the numerical data are as follows:

TABLE 3

(Third Embodiment)

| | Radius of | Center | Refractive | |
|---|---|---|---|---|

TABLE 3-continued (Third Embodiment)

| No. | curvature R | thickness or space d | index n | |
|---|---|---|---|---|
| 1 | ∞ | 1.20 | 1.492 | L11 |
| 2 | 12.081 | 1.00 | | |
| 3 | $r_1 = 27.2$ | 1.00 | 1.492 | L12 |
| 4 | $r_2 = 9.5$ | 8.60 | | |
| 5 | 11.3 | 3.20 | 1.492 | L2 |
| 6 | ∞ | 15.00 | | |
| | E.P. | | | |

(Non-spherical surface coefficient)

| | |
|---|---|
| 2nd surface k = 0.350 | $C4 = 0$ |
| | $C6 = 0$ |
| | $C8 = 0$ |
| | $C10 = 0$ |
| $d = 9.248$ | $D = 12.8$ |
| $l = 11.614$ | $K = 4496.7$ |
| $d' = 8.6$ | $f_T = 17.96$ |
| $f_e = 22.967$ | $f_M = 97.278$ |

13. An albada finder comprising a first lens having negative refractive power, a second lens having positive refractive power, and a third lens having positive refractive power, said first, second and third lenses being disposed in succession from the object side, said third lens having index means for indicating the photograph area of an object to be photographed, said second lens having two surfaces adjacent to the object side and the observer side, respectively, that are in contact with air, and said lens surface of said second lens which is adjacent to the object side being provided with an albada reflecting surface for reflecting a light beam from said index means toward the observer side.

14. An albada finder according to claim 13, wherein said first lens has concave surfaces on the object side and the observer side, said second lens has a convex surface facing the object side, and said third lens has a convex surface facing the observer side.

15. An albada finder comprising a first lens having negative refractive power, a second lens having negative refractive power, and a third lens having positive refractive power, said first, second and third lenses being disposed in succession from the object side, said third lens having index means for indicating the photograph area of an object to be photographed, and said second lens having two surfaces adjacent to the object side and the observer side, respectively, that are in contact with air, said lens surface of said second lens which is adjacent to the object side being provided with an albada reflecting surface for reflecting a light beam from said index means toward the observer side.

16. An albada finder according to claim 15, wherein said first lens has a concave surface facing the observer side, said second lens is a negative meniscus lens having a convex surface facing the object side, and said third lens has a convex surface facing the observer side.

17. An albada finder according to claim 15, wherein said first lens has a concave surface facing the observer side, said second lens is a negative meniscus lens having a convex surface facing the object side, and said third lens has a convex surface facing the object side.

18. An albada finder comprising an object lens component and an eyepiece lens component, said object lens component and said eyepiece lens component being disposed in succession from the object side, said eyepiece lens component having an index means for indicating the photograph area of an object to be photographed, said object lens component including a lens having two surfaces adjacent to the object side and the observer side, respectively, that are in contact with air, said lens surface which is adjacent to the object side being provided with an albada reflecting surface for reflecting a light beam from said index means toward the observer side.

* * * * *